April 18, 1950     R. M. JOHANNS     2,504,199
INTERMEDIATE DRIVE FOR PHONOGRAPH MOTORS
Filed Dec. 28, 1946     2 Sheets-Sheet 1

Inventor
Robert M. Johanns
By Wooster & Davis
Attorneys

April 18, 1950  R. M. JOHANNS  2,504,199
INTERMEDIATE DRIVE FOR PHONOGRAPH MOTORS
Filed Dec. 28, 1946  2 Sheets-Sheet 2

Inventor
Robert M. Johanns
By Wooster & Davis
Attorneys

Patented Apr. 18, 1950

2,504,199

UNITED STATES PATENT OFFICE 2,504,199

INTERMEDIATE DRIVE FOR PHONOGRAPH MOTORS

Robert M. Johanns, Syracuse, N. Y.

Application December 28, 1946, Serial No. 718,975

14 Claims. (Cl. 74—207)

This invention relates to a motor drive mechanism, and especially to the intermediate drive between a motor and the driven element. It was especially designed for the drive of a phonograph turntable, but, of course, is not limited to such use, but may be employed in drives where similar conditions and operation are to be met. In the design and construction of certain drive mechanisms, especially those involving a relatively high ration between the driving and the driven elements, consideration and solution of problems not generally obvious are required. For example, in the design of phonograph motor units, it is important that such factors as freedom from all but a minimum of mechanically generated noise, simplicity of design and assembly, the use of inexpensive components, relative constancy of turntable speed in the face of varying operating conditions, and flexibility of mounting, be dealt with.

It is, therefore, an object of this invention to provide an improved drive for phonograph turntables and similar devices in which mechanically generated noise and its transfer to the reproducing means is reduced to a minimum.

It is also an object to provide such a drive which is characterized by simplicity of design and assembly, and which may be constructed of inexpensive components.

It is a further object to provide such a drive which will produce relatively constant speed for the turntable or other driven element regardless of varying operating conditions.

It is another object to provide a novel means of transferring a rotary motion from a driving to a driven element by a shock absorbing, adjustable and also self-adjusting intermediate assembly which tends to solve the problems above enumerated.

A still further object is to provide a novel construction which will satisfactorily transfer rotary motion, especially from low powered inexpensively made mechanical or electrical motors, to driven elements or assemblies, at relatively constant speed, without undue mechanical noise, and in spite of abnormally inaccurate influencing components, assemblies and operating conditions.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

Specifically this novel device comprises a spring support, herein called the carrier, fabricated from ribbon or round resilient wire stock, one or more additional springs called pushers, the means for mounting and adjusting the carrier and pushers, an intermediate drive assembly carried by the carrier, novel means for mounting and holding the support for the intermediate drive assembly, means for reducing transmission of mechanically generated noise to the driven element and means for driving the complete assembly at relatively constant speed.

Figure 2:
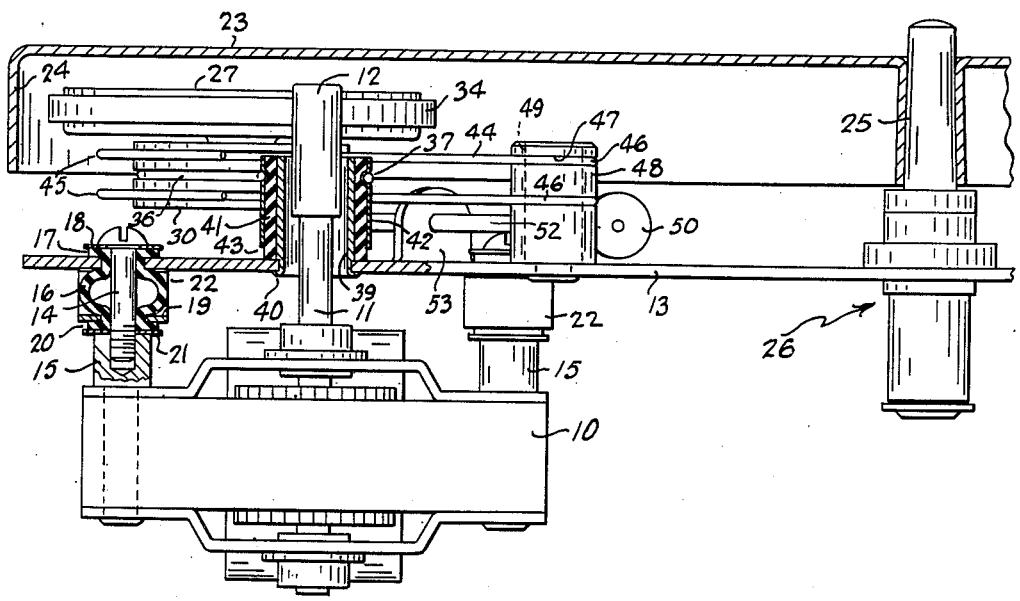
Fig. 2 is a partial side elevation and partial section on an enlarged scale, the section being substantially on line 2—2 of Fig. 1.
Figure 3:
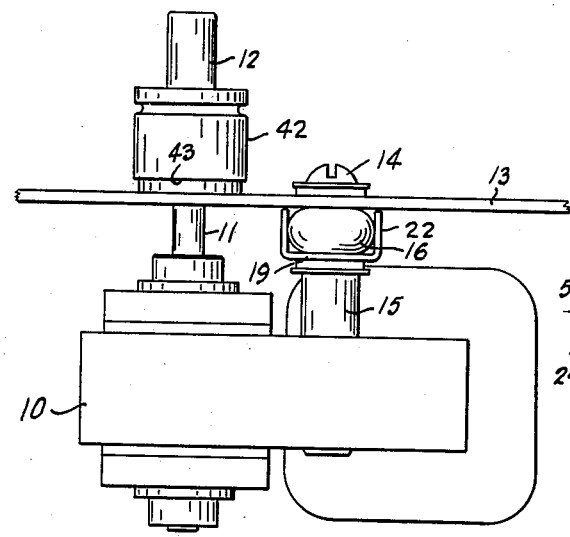
Fig. 3 is a side elevation of the motor.

It will be understood that the assembly of these primary elements may assume various forms and that the specific construction and arrangement shown is only one specific example for securing the objects and advantages disclosed. This construction as illustrated comprises an electric motor 10 of any suitable construction, although it will be understood it could be a mechanical, fluid or other type of motor, operating a rotary shaft 11 on which is a drive pulley 12. The motor may be mounted by any suitable means, but in the present arrangement it is suspended from the drive mounting plate 13 of a phonograph. It is mounted by a support which will reduce to a minimum the transfer of noises from the motor to the plate 13. For this purpose it is suspended by any suitable number of screws 14, two being used in the present construction, extending through openings in the plate 13 and threaded into suitable lugs or studs 15 on the motor. Surrounding the screw 14 is a resilient insulator 16 also extending through the plate 13 and provided with a flange 17 resting on the top thereof with a washer 18 under the head of the screw resting on this flange. The opposite end portion of the insulator passes through an opening in the base or connecting member of a U-shaped bracket 19 with a similar flange 20 on the lower side and another washer 21 between this flange and the lug or stud 15. The side arms of the U-shaped bracket 19, indicated at 22, are ordinarily spaced a short distance from the plate, but may engage the under side of the plate 13 to limit the amount to which the lugs 15 can be drawn toward the plate 13 by the screws 14 to compress the insulator 16 and to cause an intermediate bulge, as shown in Fig. 2. It will be seen with this mounting there is no metal contact between the motor and the plate 13, but there is a portion of the resilient insulator 16 between all metal elements of the motor and this plate, and as this insulator is made of sound absorbing material, such, for example, as resilient soft rubber or other suitable material which is a poor carrier of sound vibration, there will be a minimum transfer of noises from the motor to the plate 13.

The element driven by this motor in the present illustration is a phonograph turntable 23 which is usually made of a plate of sheet metal with a downwardly turned flange 24. It is usually covered with a disc of felt or fabric on which the phonograph record rests, and at its center is supported by a suitable bearing post 25 which is tapered to fit a similarly tapered opening in the turntable and carried by a suitable bearing 26 mounted in the plate 13.

Figure 4:
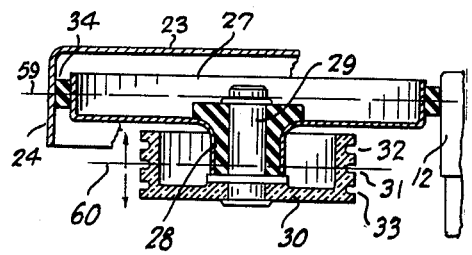
Fig. 4 is a section of the intermediate drive assembly taken substantially on line 4—4 of Fig. 1, but on a larger scale and the supporting elements being omitted.
Figure 5:
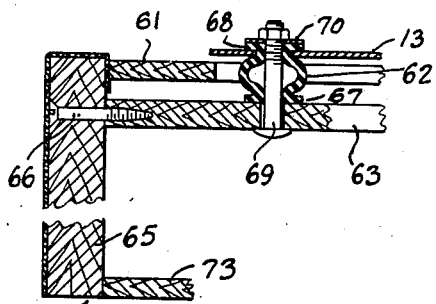
Fig. 5 is a detail section showing a mounting for the drive mounting plate.

The intermediate drive assembly comprises the intermediate drive wheel 27 which may be of any suitable construction, but in the present case is a cup-shaped wheel as shown in Fig. 4, with a suitable bearing 28 running on a suitable stud or shaft 29 mounted in a support 30 of any suitable material, either metal or some suitable molded plastic, and this mounting is also preferably substantially cup-shaped and provided with a series of annular grooves 31, 32 and 33 in its periphery. Mounted on the periphery of the wheel 27 is a friction ring 34 of any suitable material, such, for example, as resilient live rubber, adapted to engage the inner surface of the turntable flange 24 and the motor pulley 12, to form an intermediate friction drive between the motor pulley and the turntable.

This intermediate drive assembly comprising the mounting 30, the shaft 29 and the wheel 27 is mounted on the full free floating support comprising a carrier 35 composed of a heavy piano or music wire spring including a spring loop 36 seating in the intermediate groove 31 of the intermediate wheel support 30 and by its spring action gripping and holding this support. At its other end it is looped at 37 around a carrier mounting 38 supported on the plate 13, and between the loops 36 and 37 it is bent upon itself to form the shock absorbing loop 35a. The loop 37 is free to turn in the groove in the support 38 so that the carrier and elements carried thereby are free to turn about the axis of drive pulley 12 in the plane of this carrier 35. This carrier mounting comprises an inner sleeve 39 provided at its lower end with a reduced portion extending through an opening in the plate 13 and rolled over as shown at 40 to secure it to the plate. It extends upwardly from the plate and is surrounded by a sleeve 41 of resilient live rubber or other material which absorbs sound vibrations, and this sleeve 41 is surrounded by a thin metal sleeve 42 provided with a peripheral groove in which the mounting loop 37 of the carrier 35 is seated. The lower end 43 of the sleeve 42 is spaced above the plate 13 so that there is no metal-to-metal contact between the carrier and the plate 13. This mounting surrounds the rotary motor shaft 11 and pulley 12, but as will be seen from Fig. 2, is of larger diameter than the shaft and the pulley so as to be completely spaced from them, and, therefore, no sound vibrations can be transmitted from the shaft and pulley to this mounting, but it will be seen that by this arrangement this mounting 38 for the carrier 35 is concentric with the axis of the shaft and pulley. It will also be seen that this carrier supporting the intermediate drive assembly, including the intermediate drive wheel 27, provides a relatively free floating carrier or mounting for this assembly, and that it is a resilient spring mounting which is adapted to yield in all directions to permit the wheel assembly to shift or yield to compensate for any irregularities in the driving or driven elements.

Figure 1:
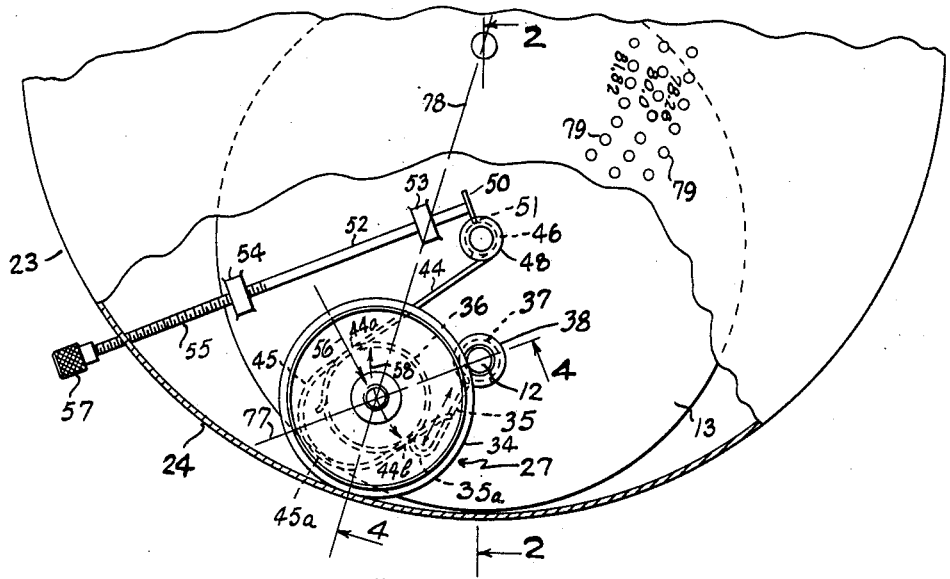
Fig. 1 is a top plan view of the drive applied to a phonograph turntable, a portion of the turntable being broken away to more clearly show the construction.

Associated with this carrier is a so-called pusher comprising one or more resilient wire members 44. These may be of round or flat ribbon stock, as desired. In the present arrangement two of these pushers are used, one above and the other below the carrier 35, so that their pressure on the intermediate wheel assembly will not tend to tip this assembly out of its normal horizontal position. This is the preferred arrangement, although a single pusher could be used. These pushers are equally spaced above and below the carrier 35, and therefore tend to hold the assembly in the proper horizontal position with the wheel 27 rotating about a vertical axis. These spring wire pushers 44 may or may not include a spring loop 45, but in the present construction they are each formed with this loop, the upper one of which seats in the upper groove 32 of the mounting 30 and the lower of which seats in the groove 33 of this mounting. The loop, however, fits these grooves only on the opposite sides thereof, as shown in Fig. 1, the intermediate portion 45a of the loop being spaced from the mounting 30 so as to permit limited relative longitudinal movement of the mounting in the loops. At their opposite ends the pushers 44 each include a mounting loop 46 tightly gripping and seating in grooves 47 in a shock absorbing mounting block 48 mounted on a solid stud 49 mounted in the plate 30. This permits turning movement of the mounting block 48 to vary the pressure of the pushers 44 against the mounting 30, and therefore against the intermediate drive assembly.

The mounting block 48 may be fixed and the pushers 44 preloaded to give a constant predetermined pressure to the mounting 30, but it is preferred that means be provided for turning this mounting block 48 to vary the pressure of the spring pushers 44 against the intermediate drive wheel assembly. For this purpose there is a disc 50 seated at one edge in a notch or groove 51 in the side of the block 48, and is carried by a shaft 52 mounted in suitable bearing lugs 53 and 54. This shaft 52 is threaded at 55 and the opening in the bearing 54 is tapped so that rotation of the shaft 52 will adjust it longitudinally in this bearing and therefore will shift the head longitudinally, and by this movement will turn the block 48 to vary the pressure of the spring pushers 44 against the intermediate drive wheel assembly. This will vary the pressure of the rim of the intermediate drive wheel 27 against the flange 24 of the turntable and against the motor drive pulley 12. The direction of pressure of these pushers is substantially along the line 56 of Fig. 1, and substantially parallel to the arc of movement 58 of the axis of the intermediate drive wheel 27. The adjusting shaft 52 may be operated by any suitable means, such, for example, as a knurled head or finger grip 57. As the intermediate drive wheel assembly is carried by the spring carrier 35 which is mounted on the support 38, the path of free lateral movement of this assembly will be on the arc 58 struck about the axis of the motor pulley 12 as a center. The carrier 35 serves, therefore, to hold the intermediate drive support 30 in a relatively fixed circumferential plane. It will not unduly oppose freedom of motion within this circumferential plane, as the loop 37 is free to turn on support 38, but it will by its resilient or spring action tend to resist undue motion in the vertical or oblique direction with respect to the circumferential plane or in a radial direction toward or away from the motor pulley. It follows that the carrier mounting must center upon or else approach as closely as possible the center of the circle described by any point of the rotating element, as pulley 12, of the motor, and that the carrier be so mounted that relatively free motion within the described plane be permitted or opposed, as the case may be, and that the adjustment be held relatively constant. In addition, it is desirable that the carrier be insulated from its mounting support against transmitted vibration.

The pusher or pushers 44 serve to apply pressure to the intermediate drive support assembly 30—27. They tend to keep the intermediate drive wheel 27 in contact with the driven member, for example, the rim of a turntable 23 used as a phonograph record carrier, by applying pressure at a predetermined rate and by adjusting themselves instantly to absorb or counteract relatively small adverse influences introduced by structural irregularities of the driving element, intermediate transfer medium, or the driven element. It is desirable that the pusher or pushers be so mounted and so engage the intermediate drive mounting 30 that pressure applied to this mounting be as nearly as practicable in the direction of the arc 58 described by the floating carrier. It is likewise desirable that the pushers aid in supporting the intermediate drive mounting and assist the carrier in the execution of its function. Furthermore, it is desirable that the pusher or pushers be insulated from their own mounting support against transmitted vibration. It is further desirable that a variable pressure adjustment be provided to enable the operator to counteract changes of speed of the driving element, such as result, for example, in an electric motor from the influence of variations in line voltages upon small low torque motors, such as are usually employed for this type of drive. The mounting described for the pushers 44 accomplishes these results and advantages. It will be noted that because of the loop 45 each pusher engages the mounting 30 at the points 44a and 44b about 180° apart. If no loop is used it would engage the mounting at one of these points only. These contact point or points coincide approximately with the point or points at which a line tangent to the arc 58 would bisect this mounting. These contact point or points are firm only with respect to the applied pressure, as the mounting 30 may slide longitudinally with respect to the pushers. It therefore may be said in this connection that the pusher or pushers aid in supporting the intermediate drive mounting in a plane parallel to the plane of the arc 58, but because the pushers are free to slide on the mounting 30 in a direction parallel to the radius of this arc, they do not interfere with free movement of the mounting parallel to the plane of the arc 58 and in a direction radially of this arc.

These pushers 44 may be fixedly mounted and preloaded to apply the desired pressure to the intermediate mounting, but as stated, it is preferred to provide the means 52 for adjusting the pressure as described above and thus make it possible for the operator to vary the loading of the pushers and hold the pusher pressure constant at a given amount. This permits the operator, for example, to adjust and hold the speed of a record player turntable at the proper 80 R. P. M. regardless of certain conditions, such as long term line voltage changes which influence motor speed and consequently tend to increase or lower the turntable speed and thus vary the pitch of the reproduction.

The intermediate drive wheel mounting acts as a support for this wheel which transfers rotary motion from the driving element 12 to the driven element 24. With the arrangement shown it is designed in such a manner that the carrier and the pusher or pushers may engage it, hold it in proper position with respect to the driving and driven elements, and permit it to float between these two elements in a predictable manner. The supporting elements are so arranged that the leverage from the points of pressure on the drive pulley 12 and the driven element 24 is held to a minimum. In other words, the plane of the floating support of the intermediate drive wheel mounting and the plane of pressure contact between the drive pulley, transfer or intermediate wheel and the driven element are parallel and as closely juxtaposed as is practical. It will be seen from Fig. 4 that the center line of pressure between the driving and driven elements is on the plane 59, and the center line of the plane of support is the line 60 parallel thereto and closely adjacent.

After assembly, the three primary elements of this device, namely, the drive pulley 12, the intermediate drive wheel 27, and driven element 24, together with their supports and, optionally, the auxiliary pressure adjusting device, constitute a full floating intermediate drive for transfer of rotary motion from the driving to the driven element at a predictable rate which may be varied and held fixed at any point within the limits of adjustment. This assembly tends to adjust itself to and cancel out limited structural irregularities within the driving, the transfer device, and the driven elements. In consequence, it tends to promote quiet operation of the complete speed-change train more surely than is possible for any but precision made drives.

Another advantage is that this assembly may be variably loaded with respect to the driven element without undue influence upon the driving element. In other words, variation within low limits of the load on the driven element has less effect on the driving element, and a change of contact pressure has a definitely predictable effect independently of such auxiliary devices as, for example, weighted flywheel type turntables or high torque motors. In consequence, such disturbances as, for example, "wow" in a phonograph record reproducer are minimized more simply and more easily than is now possible for any but precision type devices.

It will be evident the device may be used in many different ways for many purposes where the factors above enumerated need to be dealt with, although it is particularly adapted for, and is shown in the disclosure as, a drive for a phonograph record player.

Figure 6:
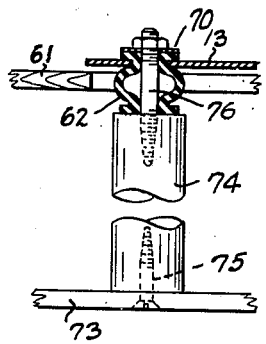
Fig. 6 is a similar detail view showing another portion of the mounting for this plate.
Figure 7:
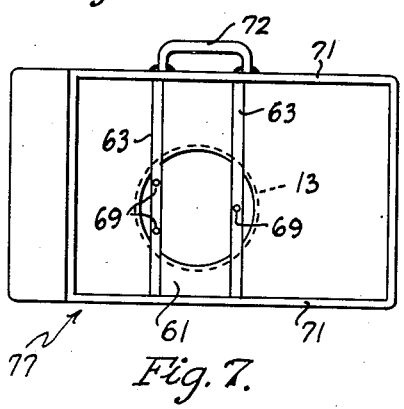
Fig. 7 is a somewhat diagrammatical view of a carrying case which may be employed.

It is preferred that the drive mounting plate 13 be mounted independently of the cover plate or motor board 61 to reduce vibration to the pickup which is supported on this plate, but it will, of course, be understood that conventional mountings may be employed if desired. For this reason, the plate 13 is mounted by the vibration insulated supporting elements 62 on supporting rods or bars 63 in the cabinet or case 64, the rods or bars being secured at their opposite ends to the side walls 65 by any suitable means, such as the screws 66. The insulating element 62 is of resilient live rubber or suitable fiber or other material which is not a good conductor of vibration. It may have a flange 67 at its lower end seating on the rod 63, and a suitable flange 68 at its upper end on the top of the plate 13, and all secured together by a suitable bolt 69 with a washer 70 between the head or nut of the bolt and flange 68. If the device is mounted in a portable carrying case 77, as shown in Fig. 7, the supporting bars 63 may extend between the side walls 71 corresponding to the side walls 65 and are preferably located in substantial alignment with the carrying grip 72 so that the weight of these rods is transmitted directly to the grip. Or, if preferred, the drive mounting plate 13 could be supported on the base 73 of the cabinet, carrying or other case, or on a shelf, as shown in Fig. 6, by means of a pillar 74 mounted on this base by any suitable means, such as the screws 75, and supporting at its upper end the insulating support 62 fastened to this pillar by any suitable means, such as the screws 76. This double support increases stability of the motor mounting without unduly impairing the cushioning effect of the insulating devices or destroying their insulating effect.

The support for the driven element, in the present instance the phonograph turntable element 26 and the turntable itself, as well as the mounting therefor in relation to the driver and the intermediate transfer assembly, are conventional. However, it is pointed out that the inherent characteristics of the new intermediate drive assembly described make careful consideration of the angle between two important center lines unnecessary. For example, if a connecting line 77 is drawn through the center of the rotating element 12 of the motor and the center of the rotating element 27 of the intermediate drive, another line 78 be drawn through the center of the driven element 23 and the center line of the rotating element 27 of the intermediate drive, and both connecting lines at right angles to the axes of the rotating element, then the magnitude of the angle included between them may be within the full practical range between 0 and 180° without unduly influencing satisfactory operation of the device.

The auxiliary pressure varying device 52 may be combined in this device with a conventional stroboscope design 79 which may be laid on and made part of the phonograph record turntable. This, when used with the proper stroboscopic light may be employed to accurately determine the proper speed of the turntable and the proper adjustment of the device 52 to secure this proper speed under the conditions of use.

As pointed out above, it is preferred the drive mounting plate 13 carrying the motor and the intermediate drive assembly be mounted independently of and kept separate from the conventional motor board 61, which can be also the supporting medium for the turntable or phonograph record support and is conventional supporting means for other phonograph record supports. However, this independent supporting of the drive mechanism insulates it from the conventional motor board, so called, and will further reduce the adverse effects of vibration resulting from irregularities within the drive assembly transmitted through the mounting plate and fastening means into the motor board where it would be further amplified. This independent mounting also adds to the stability and ruggedness of the reproducing device, because it tends to minimize the effect of shock more readily and more efficiently than the conventional motor board type of mounting. Consequently it permits the use of acoustically desirable materials for motor board constructions, although these may not be at all satisfactory for use as drive supporting media.

Throughout the specification and claims the term "wire" is used in a generic sense as meaning any suitable cross section as round, flat, ribbon, square, or any other shape found suitable.

Having thus set forth the nature of my invention, I claim:

1. An intermediate drive for phonographs and the like comprising an intermediate drive wheel adapted to engage the rim of a turntable, a motor pulley engaging the rim of the wheel, a motor for driving the pulley, a resilient mounting for the wheel yieldable in all directions to permit movement of the wheel in all directions, including movements at right angles to the plane of the wheel as well as in this plane to provide a free floating mounting for the wheel, and a resilient pusher tending to push the wheel laterally against the rim and pulley.

2. A drive of the character described comprising an intermediate wheel adapted to frictionally engage a turntable and the like to drive it, a support for said wheel, a full floating mounting for the wheel yieldable in all directions to permit movement of the wheel in all directions, a motor, a pulley driven by the motor engaging the rim of the wheel, and a pressure pusher tending to force the mounting laterally to press the wheel against the turntable and the pulley.

3. A drive for a phonograph turntable and the like comprising a motor, a pulley driven by the motor, an intermediate wheel between the pulley and turntable and having frictional engagement therewith for driving connection between them, a full floating resilient mounting for the wheel including a resilient supporting wire adapted to yield in all directions to permit movement of the wheel in all directions, means mounting the wire at a location spaced from the wheel, and a resilient pusher engaging the mounting and tending to force it laterally to press the wheel against the turntable and pulley.

4. A drive for a phonograph turntable and the like comprising a motor, a pulley driven by the motor, an intermediate wheel between the pulley and turntable and having frictional engagement therewith for driving connection between them, a mounting for the wheel, a resilient wire including a loop embracing the mounting, a support to which the wire is connected, a second support, and a resilient wire pusher mounted on the second support and tending to press the wheel against the turntable and the pulley.

5. A drive of the character described comprising an intermediate wheel adapted to frictionally engage a turntable and the like to drive it, a mounting for said wheel, a carrier for the mounting comprising a resilient wire including a loop embracing the mounting, a rotatable driving pulley engaging the rim of the wheel, and means mounting the carrier at a point spaced from said loop.

6. A drive of the character described comprising an intermediate wheel adapted to frictionally engage a turntable and the like to drive it, a mounting for said wheel, a carrier for the mounting comprising a resilient wire including a loop embracing the mounting and bent backwardly on itself to form a shock loop adjacent the first loop, means mounting the carrier located on the opposite side of the second loop from the first loop, and a rotatable driving pulley engaging the rim of the intermediate wheel.

7. A drive of the character described comprising an intermediate wheel adapted to frictionally engage a turntable and the like to drive it, a mounting for said wheel, a carrier for the mounting comprising a resilient wire including a loop embracing the mounting, a rotatable driving pulley engaging the rim of the wheel, means mounting the carrier at a location spaced from the wheel, and a resilient pusher tending to press the wheel against the turntable and pulley.

8. A drive of the character described comprising an intermediate wheel adapted to frictionally engage a turntable and the like to drive it, a mounting for said wheel, a carrier for the mounting comprising a resilient wire including a loop embracing the mounting and bent backwardly on itself to form a shock loop adjacent the first loop, means mounting the carrier located on the opposite side of the second loop from the first loop, a rotatable driving pulley engaging the rim of the wheel, and a pusher comprising a resilient wire engaging the wheel mounting and tending to press the wheel against the turntable and pulley.

9. A drive of the character described comprising an intermediate wheel adapted to frictionally engage a turntable and the like to drive it, a mounting for said wheel comprising a circular member and a shaft carried by said member, said member being provided with a circumferential groove, a carrier for the mounting comprising a resilient wire including a loop embracing said member and seated in said groove, a rotatable driving pulley engaging one side of the wheel, and means mounting the carrier for free turning movement about the axis of the pulley.

10. A drive of the character described comprising an intermediate wheel adapted to frictionally engage a turntable and the like to drive it, a mounting for said wheel comprising a circular member and a shaft or bushing carried by said member, said member being provided with circumferential grooves, a carrier for the mounting comprising a resilient wire including a loop embracing said member and seated in one of said grooves, a rotatable driving pulley engaging one side of said wheel, means mounting the carrier for free turning movement about the axis of the pulley, and a pusher comprising a resilient wire including a loop seated in another groove on the mounting, and means mounting the pusher to load it to press the wheel against the turntable and pulley.

11. A drive of the character described comprising an intermediate wheel adapted to engage a turntable and the like to drive it, a mounting for the wheel including a circular member provided with three laterally spaced peripheral grooves, a carrier for said mounting comprising a resilient wire including a loop seated in the intermediate of said grooves, a rotatable driving pulley engaging the rim of said wheel, means mounting the carrier for free turning movement about the axis of said pulley, a pair of pushers each comprising a resilient wire including a loop seated in one of the other grooves, and means mounting the pushers in a manner so they tend to press the intermediate wheel against the turntable and pulley.

12. A drive of the character described comprising an intermediate wheel adapted to frictionally engage a turntable and the like to drive it, a mounting for said wheel, a carrier for the mounting comprising a resilient wire including a loop embracing the mounting, a rotatable driving pulley engaging the rim of the wheel, means mounting the carrier to turn about the axis of the pulley, a pusher comprising a resilient wire engaging the wheel mounting to press the wheel against the turntable and pulley, a pivotal mounting means for the pusher, and means for turning said pivotal mounting to vary the pressure of the pusher.

13. A drive of the character described comprising an intermediate wheel adapted to engage a turntable and the like to drive it, a mounting for the wheel including a circular member provided with one or more spaced peripheral grooves, a carrier for said mounting comprising a resilient wire including a loop seated in one of said grooves, a rotatable driving pulley engaging the rim of said wheel, means mounting the carrier for turning movement about the axis of the pulley, one or more pushers each comprising a resilient wire including a loop seated in one of the grooves on the opposite sides of the loop only and tending to press the wheel against the turntable and pulley, a rotatable mounting for the pushers, and means for turning said latter mounting to vary the pressure of the wheel.

14. A drive of the character described comprising an intermediate wheel adapted to frictionally engage a turntable and the like to drive it, a mounting for said wheel comprising a circular member provided with a circumferential groove, a carrier for the mounting comprising a resilient wire including a loop embracing said member and seated in the groove and bent backwardly upon itself to provide a shock loop at one side of the first loop, a rotatable pulley engaging one side of the wheel to drive it, means on the opposite side of the shock loop from the first loop mounting the carrier for turning movements about the axis of the pulley, at least one pusher comprising a resilient wire engaging the wheel mounting on opposite sides of the carrier and tending to press the wheel against the turntable and pulley, a turnable means mounting the pusher, and adjusting means for turning the latter means to vary the pressure of the pusher.

ROBERT M. JOHANNS.

REFERENCES CITED

The following references are of record in the file of this patent:

UNITED STATES PATENTS

| Number | Name | Date |
|---|---|---|
| 297,407 | Jenkin | Apr. 22, 1884 |
| 2,386,503 | Pressley | Oct. 9, 1945 |
| 2,421,910 | Hartman | June 10, 1947 |